(12) United States Patent
Rinne et al.

(10) Patent No.: US 7,320,029 B2
(45) Date of Patent: Jan. 15, 2008

(54) QUALITY OF SERVICE DEFINITION FOR DATA STREAMS

(75) Inventors: Janne Petri Rinne, Tampere (FI); Mika Liljeberg, Helsinki (FI); Jarkko Juhani Jouppi, Tampere (FI)

(73) Assignee: Nokia Corporation, Espoo (FI)

( * ) Notice: Subject to any disclaimer, the term of this patent is extended or adjusted under 35 U.S.C. 154(b) by 882 days.

(21) Appl. No.: 09/896,607

(22) Filed: Jun. 29, 2001

(65) Prior Publication Data

US 2001/0052012 A1 Dec. 13, 2001

(30) Foreign Application Priority Data

Jun. 30, 2000 (FI) .................... 20001579
Jul. 7, 2000 (FI) .................... 20001630

(51) Int. Cl.
G06F 15/16 (2006.01)
H04L 12/56 (2006.01)

(52) U.S. Cl. .................... 709/223; 209/230; 209/231; 209/232; 370/392; 370/352

(58) Field of Classification Search ................ 709/227, 709/201, 204, 208, 217, 228, 245, 223, 230–232; 710/3, 33, 263, 244; 370/392, 252, 452; 707/107, 104; 703/223, 230
See application file for complete search history.

(56) References Cited

U.S. PATENT DOCUMENTS 5,674,003 A * 10/1997 Andersen et al. ........... 709/228
6,023,730 A * 2/2000 Tani ........................... 709/231
6,119,171 A * 9/2000 Alkhatib ..................... 709/245
6,141,686 A * 10/2000 Jackowski et al. .......... 709/224
6,286,052 B1 9/2001 McCloghrie et al. ....... 709/238
6,377,996 B1 * 4/2002 Lumelsky et al. .......... 709/231
6,711,178 B1 * 3/2004 O'Gorman et al. ......... 370/473
6,714,992 B1 * 3/2004 Kanojia et al. ............. 719/321
6,765,909 B1 * 7/2004 Sen et al. ................... 370/392

FOREIGN PATENT DOCUMENTS

WO   WO 99/16266    4/1999
WO   WO 00/56023    9/2000

OTHER PUBLICATIONS

"Internetworking with TCP/IP, vol. 1: Principles, Protocols, and Architecture, Third Edition", Douglas E. Comer, Prentice-Hall International, Inc. 1995, pp. 335-364.

(Continued)

Primary Examiner—David Wiley
Assistant Examiner—Jude J Jean-Gilles
(74) Attorney, Agent, or Firm—Perman & Green, LLP (57) ABSTRACT

The invention relates to a device, system and method a method for applying a certain Quality of Service (QoS) to a data stream (31a–31c, 32a–32b, 33a) of an application (31–33) communicating data over a sockets connection. The method comprises providing a uniquely identifiable identifier (UID, Stream Type) the application (31–33) or to the data stream (31a–31c, 32a–32b, 33a) from or to the application, and associating said identifier (UID, Stream Type) with a particular QoS in order to apply the particular QoS to the particular application (31–33) or to the particular data stream (31a–31c, 32a–32b, 33a), which application or data stream is identified by the identifier.

8 Claims, 5 Drawing Sheets

OTHER PUBLICATIONS

"Communication Application Programming Interfaces with Quality of Service Support"; Eberhardt et al.; 1998 IEEE; pp. 311-318.
Design and Implementation of an RSVP-based Quality of Service Architecture for Integrated Services Internet; Barzilai et al.; 1997 IEEE; pp. 543-551.

"QoSockets: a New Extension to the Sockets API for End-to-End Application QoS Management"; Florissi et al.; 1999 IEEE; pp. 655-668.
"Windows Networking Group"; Bernet et al.; Sep. 21, 1998; pp. 1-95 including Table of Contents.

* cited by examiner

Setup Application

QoS Policies:

|  | P1 | P2 | P3 |
|---|---|---|---|
| Default Policy | ☐ | ☐ | ☐ |
| MyAudioProfile | ☐ | ☐ | ☐ |
| VideoProfile | ☐ | ☐ | ☐ |
| Background | ☐ | ☐ | ☐ |

Pol1 → Default Policy
Pol2 → MyAudioProfile
Pol3 → VideoProfile
Pol4 → Background (p1-p3 = QoS Parameters) — 36

35

Settings:

| UID3 Col1 | Application Col2 | Stream Type Col3 | Used Profile Col4 |
|---|---|---|---|
| 40 | WWW Browser | www-text | Default Policy |
| 40 | WWW Browser | www-audio | MyAudioProfile |
| 40 | WWW Browser | www-video | VideoProfile |
| 99 | Application X | - | Default Policy |
| 102 | FTP | Ftp-command | Background |
| 102 | FTP | Ftp-data | Default Policy |
| - | - | - | - |

QUALITY OF SERVICE DEFINITION FOR DATA STREAMS

FIELD OF THE INVENTION

The invention relates to defining Quality of Service (QoS) for data streams to or from a particular application in a terminal device. More specifically, the invention relates to defining a QoS policy for an application communicating data over a sockets connection.

BACKGROUND OF THE INVENTION

Obtaining access between a terminal (a client) and a server over a network generally involves having sessions between the terminal, such as a mobile terminal, and the server. Also there exists terminal devices that internally establish sessions between the application as a client and a server that implements a protocol stack for example. A session is a series of interactions between a client and a server having a well-defined beginning and end and involving agreed-upon characteristics. Typically, a session involves a peer announcing to another peer a desire to establish a session, both peers negotiating the characteristics of the session, the peers engaging in a variety of transactions and one of the peers ending the session. The characteristics which are negotiated are typically the length of packets to be exchanged, the character sets which can be understood and manipulated and the versions of protocols which are to be used. A transaction is a basic unit of interaction and may include requesting and receiving information, aborting an ongoing session and informing a peer of a situation in an on-going session. All session operations to establish and terminate a session as well as all transactions result in events being generated and received by the peer. There are many event sources (sessions and transactions).

An active session can involve multiple transactions and so can generate multiple events. Depending on the speed at which an application can process events coming from its peer, it can happen that there are more transactions than it can process and so it receives more events than it can process. In this case, the events are queued up and wait to be processed within the context of that session. Events connected or related to the same session generally need to be processed in a specific order. In some protocols, a session can be suspended, in which state no transactions are allowed except a request to resume or to terminate the session.

Terminals, such as personal computers, obtain information from the Internet through a server, such as a gateway server. The Internet uses HTTP which is a simple request-reply protocol. Almost the only events are an HTTP request and its associated response. The operating system of the server, for example a proxy server or a mail server, runs a number of applications and so creates a number of threads to deal with them. The applications use the available threads as they are required. In the case of Internet access by a PC, it is convenient to create a thread in the server dynamically to deal with each request because the requests are independent from each other. Once the request has been processed, the thread has finished its activity and is terminated. Creating and terminating threads is a big overhead to the server.

A thread is basically a path of execution through a program and can be the smallest unit of execution that is scheduled on a processor. A thread consists of a stack, the state of the CPU registers, and an entry in the execution list of the system scheduler.

A thread is a single sequential flow of execution in program code and has a single point of execution. To deal with a simple process, a program comprising a single thread can be used. For more complex processes which involve running a number of applications, a program can rely on a number of threads. Operating systems usually provide thread management for the application (creation, termination and specifying the entry point: at the start of the program code).

A process consists of one or more threads and the code, data, and other resources of a program in memory. Typical program resources are open files, semaphores, and dynamically allocated memory. Each thread shares all of the resources of the process. A program executes when the system scheduler gives one of its threads execution control. The scheduler determines which threads should run and when they should run. Threads of lower priority may have to wait while higher priority threads complete their tasks. On multiprocessor machines, the scheduler can move individual threads to different processors to "balance" the load on the central processing unit.

Each thread in a process operates independently. Unless they are made visible to each other, the threads execute individually and are unaware of the other threads in a process. Threads sharing common resources, however, must co-ordinate their work, for example by using semaphores or another method of inter-process communication.

An application in the server will use the operating system thread management service and create a number of threads to manage these sessions.

Typically when a session is established between a client and server application it is done by first establishing a socket connection. To request a socket connection the client and server typically have a sockets application program interface, i.e. a sockets API, which provides a series of system calls that application programs can invoke to request sockets connection. The sockets API is supported by most major operating systems including UNIX and Microsoft Windows. For a general discussion of the sockets interface, refer to, *Internetworking with TCP/IP*, volume 1, by Douglas E. Comer, Prentice-Hall, Inc. 1995, pages 335–364.

The sockets API typically serves as an interface used by applications to communicate with the TCP/IP protocol stack. Generally, the client and server programs each invoke operating system functions that set up an association between them referred to as a socket connection. The client and server applications then invoke operating system functions to send and receive information between them over a network, such as the Internet, in a similar manner to calling functions to perform ordinary input/output. The information, for example, may include graphics, data, instructions and even computer programs.

The sockets connection between the two programs uses data structures which allow access to TCP/IP services. As was said the sockets API ordinarily provides a series of system calls that application programs can invoke to request sockets connection communication services.

More specifically, the typical approach to using sockets is that a server application creates an open socket ready to accept connections at a given IP address and (possibly well known) port. Once such a socket has been created, buffer space can be allocated to store incoming connection requests. The server socket ordinarily behaves as a passive endpoint waiting for a connection request to arrive from a client. In order for a client to send a connection request to a passive socket, the socket must have a name. Therefore, names are bound to sockets and are published so that a remote client can address the named socket. To initiate a connection to a remote socket a client application ordinarily requests a connection and specifies a local (client) socket and a remote name as parameters. Multiple clients can use a single server socket. Client requests can be queued in a buffer associated with the server socket. Typically when a request is accepted from the queue, a new socket is created and the new socket is used as the server side connection endpoint with a client. In this manner, a single well known port number can be used to establish many simultaneous socket connections. A shutdown (or dose) request usually is employed to terminate a socket connection.

Sockets are created for communication between a client device and server device over a network, and in the Symbian operating system (formerly called EPOC operating system) the application establishes sockets with a sockets server (that resides within the client device) that e.g. implements the protocol stack (such as Internet Protocol) which in hierarchy is thus below the application and a sockets API. Communication is then performed over a network (e.g. Internet) to the server device (not to be confused with the sockets server which is inside the terminal device) where communication is passed through a corresponding protocol stack, through a sockets API to the application on the server device.

UMTS (Universal Mobile Telecommunications System) is a so-called "third-generation (3G)," broadband, packet-based system for transmission of text, digitized voice, video, and multimedia at data rates up to and possibly higher than 2 megabits per second (Mbps), offering a consistent set of services to mobile computer and phone users no matter where they are located in the world. In UMTS there is a possibility for applications to get various QoS (Quality of Service) from the network. Quality of Service (QoS) is the idea that transmission rates, error rates, and other characteristics can be measured, improved, and, to some extent, guaranteed in advance. QoS is of particular concern for the continuous transmission of high-bandwidth video and multimedia information, i.e. normally a high QoS is needed for real-time transmissions. Transmitting this kind of content dependably is difficult in public networks using ordinary "best effort" protocols, which normally does not have strict real-time requirements.

A QoS policy is a stored set of QoS parameters that describes how the network protocol stack should handle the network traffic generated by a particular application or a particular type of application. A QoS policy can be identified with an arbitrary identifier. A QoS policy can be applied to one or more data streams created by one or more applications. Defining a certain level of QoS, and thus a certain QoS policy typical QoS paramaters used are bandwidth, end-to-end delay, jitter, packet loss, and packet loss correlation.

In UMTS there can be several QoS pipes (PDP contexts, Packet Data Protocol) with different QoS parameters simultaneously open between the UE (User Entity) and the UMTS network. QoS requests can be made by an application (through socket API QoS extension) or a user (through a Setup Application) or by both of them. The QoS Management Entity has the important task of deciding which QoS parameters are eventually requested from the network. If both the application and the user give QoS parameters, the parameters given by the user should dominate over the parameters given by the application. However, in a terminal device establishing sockets with a sockets server implementing a protocol stack for an application as client, a problem with how to apply these parameters to the correct set of sockets in the terminal device has been identified. Currently a problem exists in that there is no general approach to identify in the terminal device, which sockets belong to a particular application. Simply knowing the port numbers, that are established for sockets between the terminal device and the network, which applications specify as part of socket calls to identify TCP/UDP protocol end-points, is not sufficient to use for identifying an application or socket over the sockets connection. The reason is that presently not all applications use well-known port numbers but some applications may randomly use different port numbers. Also IPSec (Internet Protocol Security), which is a developing standard for security at the network or packet processing layer of network communication, which when used for security reasons, hides the port numbers. Therefore, a more reliable method of identifying the owner of a socket in the socket server is needed.

SUMMARY OF THE INVENTION

For applying QoS parameters to a data stream of an application communicating data over a sockets connection there is now provided a method, which comprises providing an individual or centrally defined unique identifier to a particular application or to a particular a data or data stream to or from the application, and associating said identifier with a particular Quality of Service policy.

In a preferred embodiment the particular operating system is the Symbian (EPOC) operating system and the identifier is the UID (Unique Identifier) of the Symbian (EPOC) operating system which identifies a particular application. Alternatively the identifier is the UID (Unique Identifier) of the Symbian (EPOC) operating system in combination with a data stream type identifier, which identifier combination identifies a particular application data stream. The present invention is about associating the UID with a particular QoS policy, whereby a certain application can reliably be provided with certain QoS parameters, i.e. according to a certain QoS policy. In this embodiment each application can use a particular QoS policy and each different application can use a different QoS policy if so desired. However, in this embodiment each application can use only one QoS policy, so different data streams from the same application all use the same QoS policy.

In a further embodiment the method further comprises that the application provides each socket with a socket specific identifier or data stream type identifier when the socket is established, and the step of also associating said socket specific identifier or data stream type identifier with the particular Quality of Service policy. Thus in this further embodiment a QoS policy is associated with the particular combination of the application specific identifier and the data stream type identifier, or alternatively the identifier identifying a particular socket or data stream type is a centrally defined unique identifier that can be used alone to identify a particular socket or a particular data stream type. Preferably a socket is established for each separate data stream from an application, whereby each data stream from a particular application is associated with a particular, but possibly, though not necessarily, different QoS policy. This enables to specify different QoS parameters, i.e. different QoS policies for different data streams from one and the same application. For example different QoS parameters may thus be applied for audio data stream than for video data stream from one and the same application (e.g. a web browser).

The association of each socket with the mentioned identifiers (and with the QoS policy) is preferably done in the socket server implementing the protocol stack within the terminal device. The socket server includes information on port numbers for each socket that is established between the peering devices. When the socket server now additionally has an agreed unique application specific identifier and also or only a socket specific identifier (which can be unique), the socket server will associate these two identifiers with data stream through any of the sockets and thus the data stream can be reliably identified over the socket connection in the terminal device, and can also be reliably given individual QoS. In this way, all sockets used by an application can always be associated with a named QoS policy. This makes it possible to specify QoS parameters for applications using a high-level policy abstraction and to identify within the protocol stack, which policy applies to a particular set of sockets.

According to a first aspect of the invention there is provided a method for applying a certain Quality of Service (QoS) to a data stream of an application communicating data over a sockets connection, characterised in that the method comprises providing a uniquely identifiable identifier to at least one of the application and the data stream from or to the application, and associating said identifier with a particular QoS in order to apply the particular QoS to said at least one of the particular application and the particular data stream, which application or data stream is identified by the identifier.

In one embodiment the method further comprises providing a socket application program interface to the application, establishing a socket for transfer of the data stream, and transferring the identifier over the socket application program interface to uniquely identify said at least one of the particular application and the particular data stream, which application or data stream is identified by the identifier, in order apply the particular QoS to the data stream being communicated over the sockets connection.

According to a second aspect of the invention there is provided a device comprising an application program for executing a particular application, and means for communicating data over a sockets connection, characterised in that the device further comprises means for providing a uniquely identifiable identifier to at least one of the application and the data from or to the application, and means for associating said identifier with a particular QoS in order to apply the particular QoS to said at least one of the particular application and the particular data, which application or data is identified by the identifier.

According to a third aspect of the invention there is provided a device comprising an application program for executing a particular application, and means for communicating data over a sockets connection, characterised in that the device further comprises means for associating a centrally defined identifier, which identifies at least one of the application and the data from or to the application, with a particular QoS in order to apply the particular QoS to said at least one of the particular application and the particular data, which application or data is identified by the identifier.

According to a fourth aspect of the invention there is provided a computer program product for an electronic device having an application to communicate data over a sockets connection, characterised in that the computer program product comprises computer program means for providing a uniquely identifiable identifier to at least one of the application and the data from or to the application, and computer program means for associating said identifier with a particular QoS in order to apply the particular QoS to said at least one of the particular application and the particular data, which application or data is identified by the identifier.

BRIEF DESCRIPTION OF THE DRAWINGS

The invention will be discussed below in detail by referring to the enclosed drawings, in which.

DETAILED DESCRIPTION

To describe the invention in more detail, as an example is used the Symbian Operating System (formerly EPOC OS) which is is an operating system designed for small, portable computer-telephones with wireless access to phone and other information services. In the Symbian (EPOC) operating system there are UIDs, i.e. globally Unique IDentifiers consisting of 32-bit numbers, that are used to enable various kinds of file and object identification and association. Symbian (EPOC) objects are identified by a compound identifier, known as the UID type, which is constructed from three 32 bit individual UIDs. The individual UIDs making up the UID type are referred to as its UID1, UID2 and UID3 components. Symbian OS (EPOC OS) makes widespread use of UIDs. UIDs are used to identify the types of different objects at runtime and loadtime—for example identifying executables, DLLs (Dynamic Link Library), and filestores. UIDs are used to verify that objects present compatible and expected interfaces at runtime and loadtime, for example verifying that DLLs are of the expected type or that filestores are of appropriate type. UIDs are fundamental to the association of applications with documents, for example associating a document with an application allows the system to launch the application when the document is opened. The UIDs are specified centrally by Symbian, which is the company developing the Symbian (EPOC) operating system, and the UIDs are centrally stored in a database. To receive UIDs application developers need to request them from Symbian to ensure the operating system knows which application each UID identifies and also to ensure the UIDs are centrally fixed so that there are not free choice UIDs that applications could use (except for development purposes only). Information on requesting and providing Symbian OS (EPOC) application developers with UIDs is described in Symbian (EPOC) technical papers, and at the time of filing this patent application in the following web site (which is likely to change): http://developer.epocworld.com/techlibrary/technotes/uidinfo.html.

Figure 1:
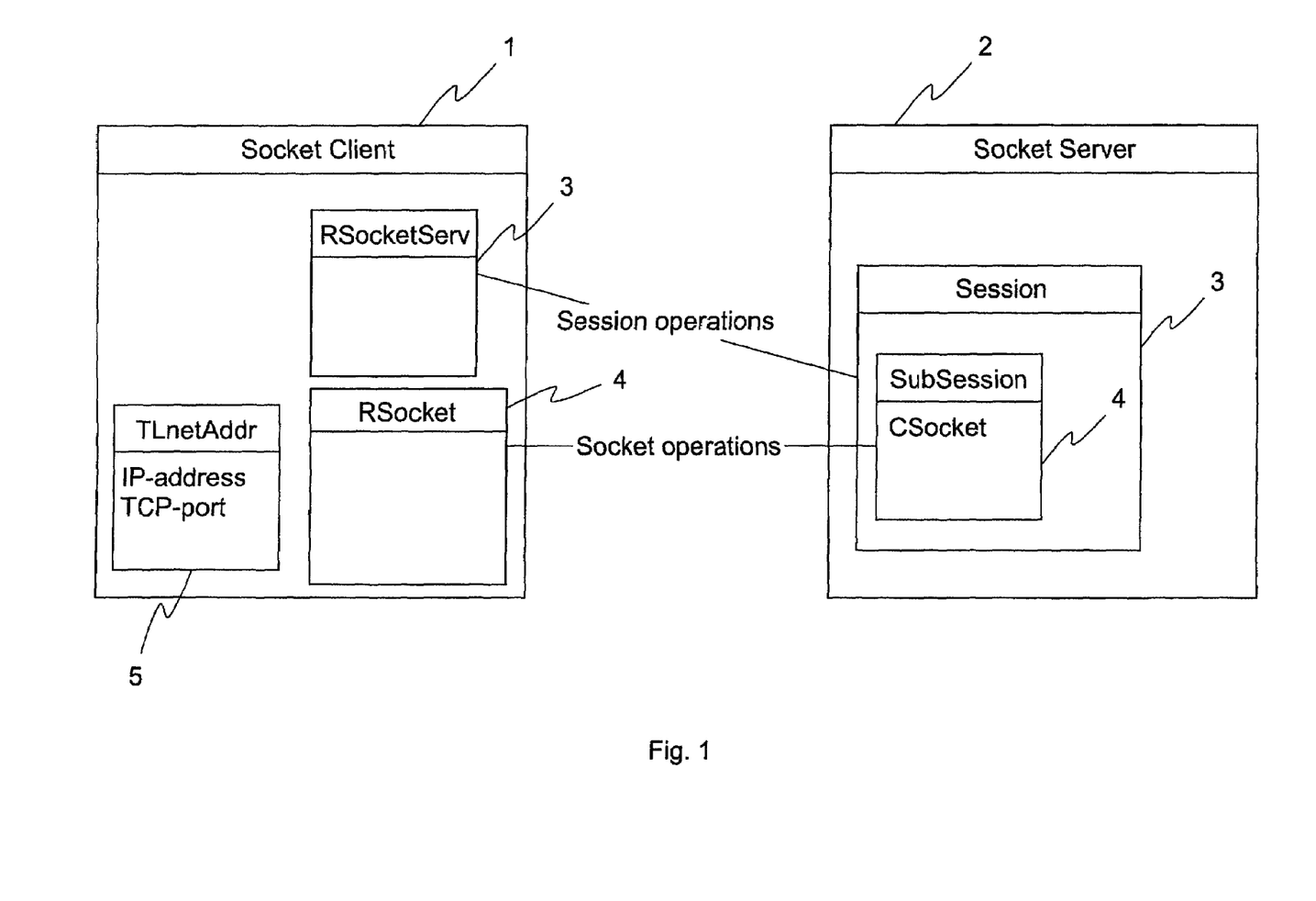
FIG. 1 illustrates the Symbian (EPOC) Socket Architecture, including a client and a server within a terminal device, on a general level.

Now referring to FIG. 1 there is illustrated the Symbian operating system (formerly EPOC OS) Socket Architecture on a general level. It clarifies the relationships between processes of Client module 1 and Socket Server 2 module side both of them residing in the terminal device (which is eg. a radio communication device such as a cellular telephone), preferably as functional modules implemented in software (computer code). The socket server 2 provides a generic interface to communications protocols through communication end points known as the sockets. When starting any network communication, a connection to a socket server, a part of the terminal operating system, must be made through a function called Connect() which creates an Inter-Process Communication channel to the socket server. Thus first a session 3 is established between the client 1 and the socket server 2. Then a socket (a sub session) 4 has to be opened to the socket server 2 by using a function named Open( ). This opened socket 4 is then used to connect to the desired host or server in the network.

On the client side the operation is thus the following. First a session 3' is established with the socket server 2 after which a socket 4' (in the form of a sub session) is opened to the socket server 2. Then an IP address (Internet Protocol) is created and a port number is given as address 5. The opened socket is used to also connect to the desired host and transfer information through the socket to the host.

Now referring to FIG. 2 there will be described the method according to a first embodiment of the present invention. In general the invention is concerned with how to identify within the procol stack, which sockets belong to a particular QoS policy and how to map QoS policies to applications. According to the invention the method comprises providing an individual application specific identifier UID to a particular application for a particular operating system, which in this example is Symbian OS (EPOC OS), upon request by the application developer and storing said application specific identifier in a central database, and controlling the use of identifiers to allow use of only requested and centrally stored identifiers (except for development purposes). According to the invention, and a first embodiment of the invention the method comprises associating the application specific identifier UID with a particular Quality of Service policy. For this purpose there is provided a database 20 in the terminal device, which database is used by the socket server 24. The application program 21 runs on a thread 22 of the processor of the client, such as a mobile terminal device, and the application opens a socket 23 to the socket server 24. Every Symbian (EPOC) application 21 has a unique identifier called the UID or more specifically UID3. In the Symbian (EPOC) operating system each process 25 can be given a unique identity, known as the process type 26, in order to differentiate one process from another. The process type 26 can be constructed from one, two or three UID components. The first approach is that the client socket 23 inside the application thread 22 could fetch the UID3 from Process Type 26 and then give it to socket server 24 along with other inter-process signalling 27, so that the application can be identified in the protocol stack 28. This could be done, for example, in the Open function mentioned above in connection with FIG. 1. The approach of FIG. 2 is particularly useful for setting the default policy for legacy applications that cannot be modified (e.g. source code is not available).

The operating system, in this case Symbian (EPOC), of the client includes a Setup Application 20, where the user is allowed to build up his/her own QoS policies. P1-P3 stand for different Quality of Service parameters that the user may select to include or exclude in a particular QoS policy. The QoS setting interface might as well be much simpler to the user. For instance the user might set only a general QoS level (e.g. levels 1–4) for each application. There may also be default QoS policies for applications imported to the device when installing applications. In FIG. 2 there is shown three QoS policies: App1 settings, App2 settings and Default settings. In this particular embodiment each separate application 21 is allowed to have one QoS policy, for which purpose the particular application specific identifier UID is associated with a particular one of the QoS policies. The association between the particular UID and QoS policy is added to the socket server 24 (by means of it being in the database 20 from where the socket server 24 reads information to associate a certain QoS with a certain application/socket). Because applications can now be unambiguosly identified in the protocol stack by usage of UID3s, it is possible to use a different QoS policy for each application. This approach is suitable especially for legacy applications which cannot be modified but still require QoS policing.

Now referring to FIGS. 3a and 3b the further, second embodiment of the invention will be described. In this embodiment the method further comprises that the application provides each socket with a socket specific identifier when the socket is established, and the step of associating the socket specific identifier with the particular Quality of Service policy. Thus in embodiment a QoS policy is associated with the particular combination of the application specific identifier and the socket specific identifier. In FIG. 3a there is shown three different applications, where one is a www browser 31, a second one is a FTP application 32 and the third one is called Application X, for example a word processing application 33. In the example shown in FIG. 3a the third application 33 has a single data stream 33a for which purpose a single socket s1 is opened through the socket API 34. The second application 32, i.e. the ftp application, has opened two data streams, one 32b for ftp data and one 32a for ftp commands for which purpose there is opened two different sockets s2 and s3. The first application 31, i.e. the web browser has opened three different data streams, one 31c for video transfer, a second one 31b for audio transfer, and a third one 31a for text transfer for which purpose there is opened three different sockets s4, s5 and s6.

Figure 2:
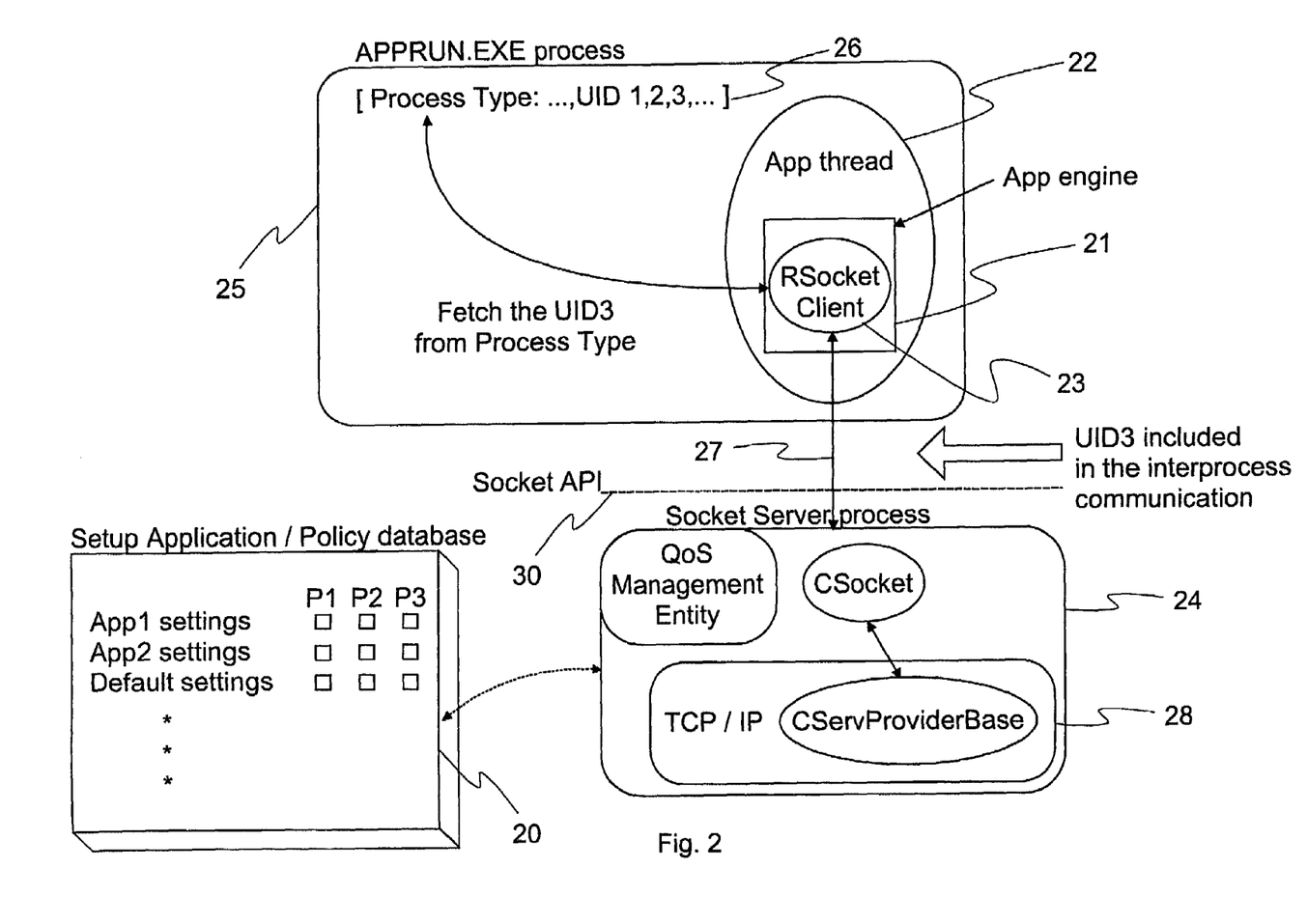
FIG. 2 illustrates the usage of an application specific identifier for applying a specific QoS on a specific application.
Figure 3:
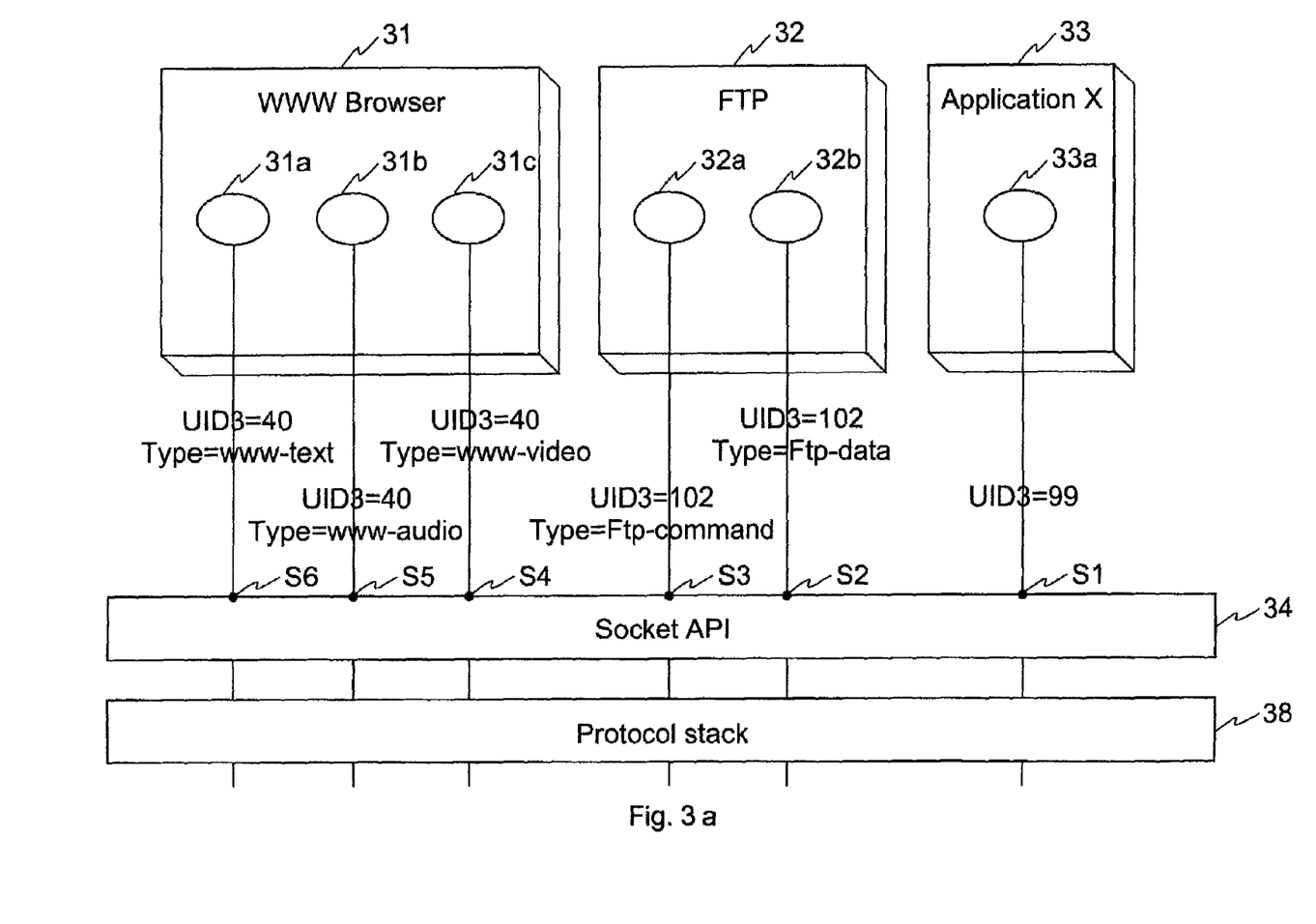
FIG. 3a illustrates the usage of an application specific identifier and a data stream type identifier for applying a specific QoS on a specific socket.
FIG. 3b illustrates in relation to FIG. 3a a setup application of the operating system of the terminal device.

In the embodiment of FIG. 2 there is a restriction that only one QoS policy can be used by each application. However, there are applications 31, 32 that transport very different kinds of data streams which have various QoS requirements, and for each data stream a new socket s1–s6 is opened. In the embodiment of FIG. 3 the Symbian (EPOC) applications 31–33 and the socket interface 34 are modified so that when an application 31–33 opens a new socket s1–s6, it will in addition to the application specific identifier UID3 specify a data stream type, e.g. by giving it as a parameter in one of the socket API calls. An example of this could be a FTP application and its two data stream types FTP_command s3 and FTP_data s2 . Typically FTP_command, which means transporting the FTP commands, would have similar QoS as other terminal sessions like Telnet. FTP_data which transfers the actual data could be background-traffic. The application developer can freely define own data stream type names for the application. Thus the data stream type names do not necessarily have to be unique, but if they have to, the application identifier UID3 could be used as a part of the data stream type name in order to thus provide a unique identifier for the data stream type. Alternatively instead of centrally defining unique application specific identifiers, the centrally defined unique identifiers UID, UID3 could be for different data stream types of different applications.

Figure 3B:
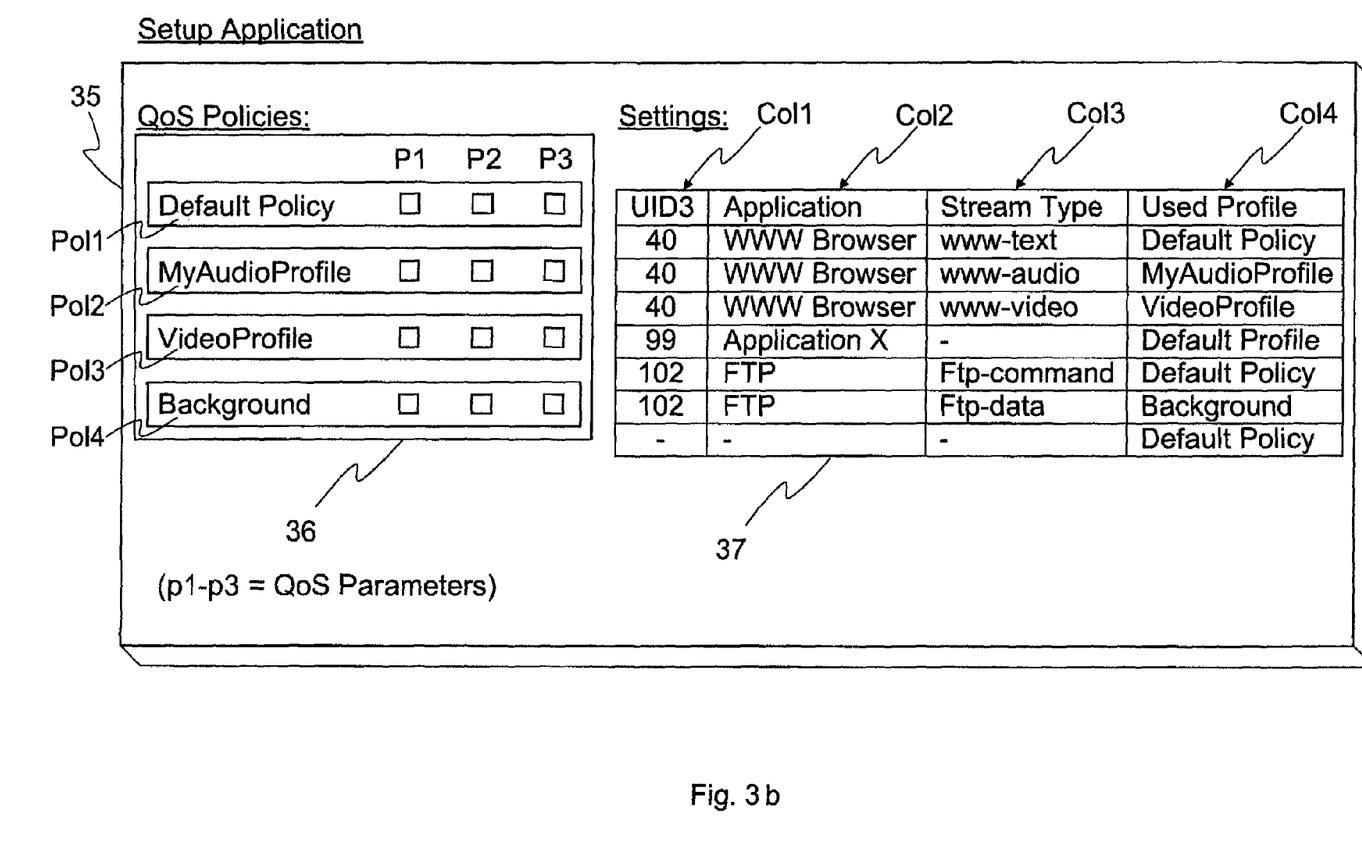

When an application 31–33 is installed, its data stream types 31a–31c, 32a–32b, 33a are stored into the application architecture so that the types can be seen in the Setup Application 35 of the operating system, as shown in FIG. 3b. Preferably, the data stream types are stored automatically in the Setup Application upon installing the application. The Setup Application is a software file stored in the client which is read when a socket is established to get recent fresh configurations. The Setup Application could alternatively be read for example when power is turned on, similarly as a .ini file in personal computers.

The user is allowed to define different QoS policies Pol1–Pol4 into a policy database 36 using a Setup Application and the user interface of the client terminal device, and names them as he or she wants. In the example shown in FIG. 3 the policies are "Default Policy" Pol1, "MyAudio-Profile" Pol2, "VideoProfile" Pol3 and "Background" Pol4. The user can then associate the different application data stream types (www-text, www-audio, www-video, ftp-command, and ftp-data) with the wanted policies or just set a certain QoS level (e.g. 1–4) as was said earlier. This is done in a database table 37 comprising a first column col1 specifying the application specific identifier UID3, a second column col2 specifying the particular application concerned, a third column col3 specifying the data stream type, and a fourth column col4 specifying the QoS policy. In the example shown in FIG. 3a the www browser application 31 has been given the identifier 40, the ftp application 32 has been given the identifier 102 and the application X has been given the identifier 99. As shown in FIG. 3b for the www-text data stream from the www browser application the Default Policy Pol1 has been defined as the QoS policy, whereby the www-text data stream will use those QoS parameters P1–P3 that has been defined in the policy database 36, where P1 can be e.g. bit rate, P2 delay and P3 delivery order.

It is also possible that an operator or mobile terminal manufacturer predefines some QoS policies that are seen useful or practical, e.g. a "VOIP" profile, which is tuned to fit especially to a certain operator's network, and thus would be readily stored in the client device in relation to having installed the operating system, e.g. Symbian (formerly EPOC).

When an application 31–33 opens a socket s1–s6 for one of its data stream types the protocol stack 38 looks up the policy database 35, 36, 37 if there is a policy defined for this data stream type. If a policy was found, it would override any possible QoS parameters given through the socket API QoS Extension by the application. If the application does not specify any data stream type for the socket, the QoS policy will be determined according to the unique application identifier as in the embodiment of FIG. 2.

This approach makes it possible to define multiple QoS policies per application or to group multiple applications under a single policy, giving the user more control over the QoS settings.

The present invention defines a way of mapping user defined QoS policies to different applications, and moreover to the individual sockets used by the applications. In the specific example of Symbian OS (EPOC), the socket server can look up a user defined QoS policy from a QoS policy database and configure the data stream using the QoS parameters contained in the QoS policy. The user can define at least one QoS policy for any application regardless of whether it supports the socket API QoS Extension. This extends QoS support also to legacy applications. As was described in connection with prior art the usual approach in the Internet world has been to look up policies based on the transport end-point addresses (e.g. port numbers) of the opened sockets. Unfortunately, this prior used approach does not apply to those applications that do not have or use well-known port numbers. Nor does it allow differentiation between different applications that use the same port numbers (e.g. connect to the same kind of servers). Also, the known port number approach is difficult on the user, as it requires intimate knowledge of technical issues, such as transport end-point addresses. Thus compared to prior solutions the present invention provides a simpler and more intuitive method of identifying QoS policies by either automatically using an application specific identifier, which the user doesn't need to know (as the operating system associates applications and corresponding user configurations) and by associating QoS policies with the application specific identifier and alternatively additionally with a socket specific identifier to specify QoS for each data stream type in a simple table manner in a Setup Application.

The socket server 2, 24 will communicate to the network the QoS parameters to be used for a certain data stream transmitted from the terminal device, and especially the QoS requirements for a certain data stream to be received by the terminal. For example, in UMTS there can be defined different QoS for uplink and downlink transmission. The user is preferably allowed to define desired level of QoS, since also costs of a transmission can be dependent on selected QoS. For example, in a video transmission to the terminal device, the user could require a higher QoS to ensure good quality picture and viewability of the received video. Thus, it is especially desirable that the terminal device is capable of identifiying each application and each data stream reliably in order to apply a desired QoS to a desired data stream. The present invention provides a solution to this by associating QoS with one of a unique application specific identifier and a unique data stream specific identifier. As the socket server 2, 24 is able to reliably identify the application and/or the data stream, the socket server is able to communicate to the network exactly desired QoS requirements for a certain data stream (and the user is allowed to choose a specific QoS for a certain data stream).

Figure 4:
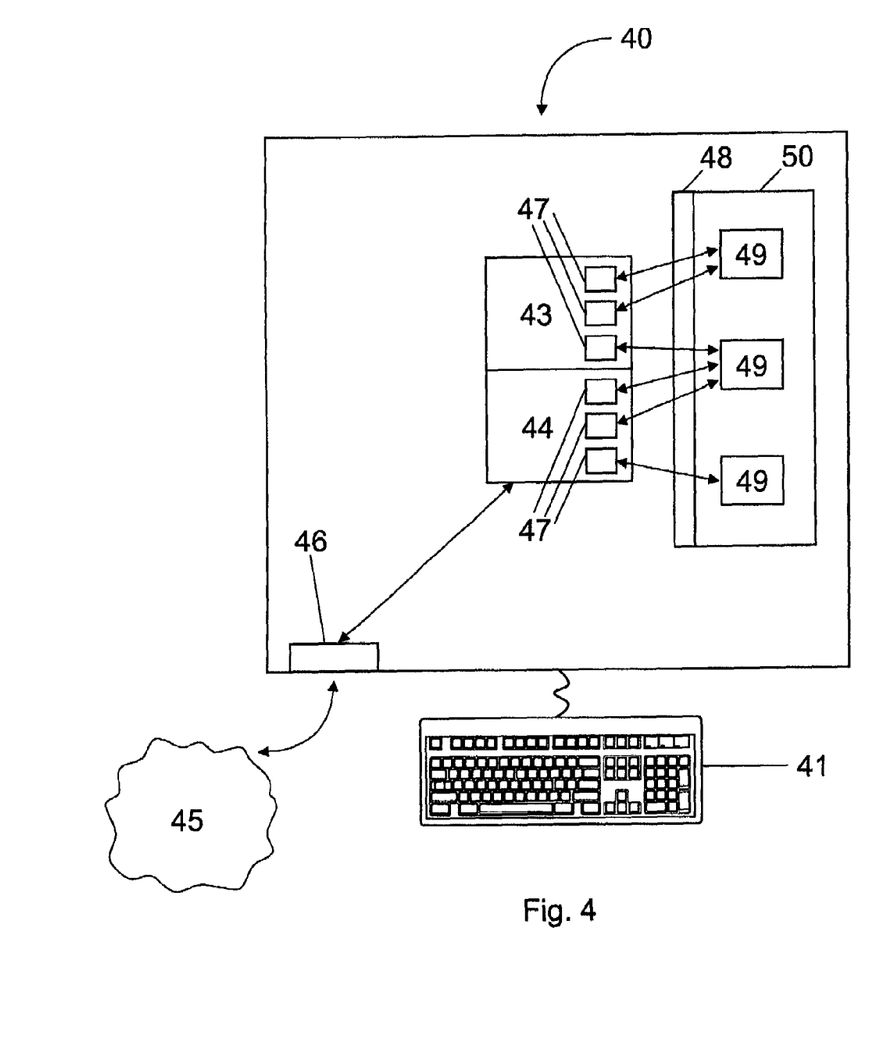
FIG. 4 shows a client device embodied in hardware.

FIG. 4 shows a device 40 according to the invention, such as a client embodied in hardware such as a computer or a mobile terminal. The client 40 has dynamic memory, processing power and memory to store all of the programs needed to implement the gateway server such as the application program, the protocol stacks and the operating system. The client 40 comprises a user interface such as a keyboard 41 (shown here as a computer keyboard but can be a traditional mobile phone keypad) and a display (not shown). The client 40 has an application program 43 which utilizes the underlying communication protocol to be in contact with a server in the network, and process events such as handling a request to retrieve HTML from a server. The client also has a protocol stack 44 such as a TCP/IP implemented in a socket server. The application program 43 controls flow of data, including commands, requests and information, between the computer and the network to which it is connected such as the Internet 45. The client 40 communicates with a server or host located remotely over a network, e.g. the Internet 45 through the protocol stack 44 and a network interface 46 (such as a network driver).

Individual threads 47 present in the application program 43 and the protocol stack 44 use one or more processors 49 (depending on the implementation of the client device) in the client 40 to carry out necessary processing tasks. Allocation of threads to processors is provided by threading services 48 present within the operating system 50 of the computer 40.

Figure 5:
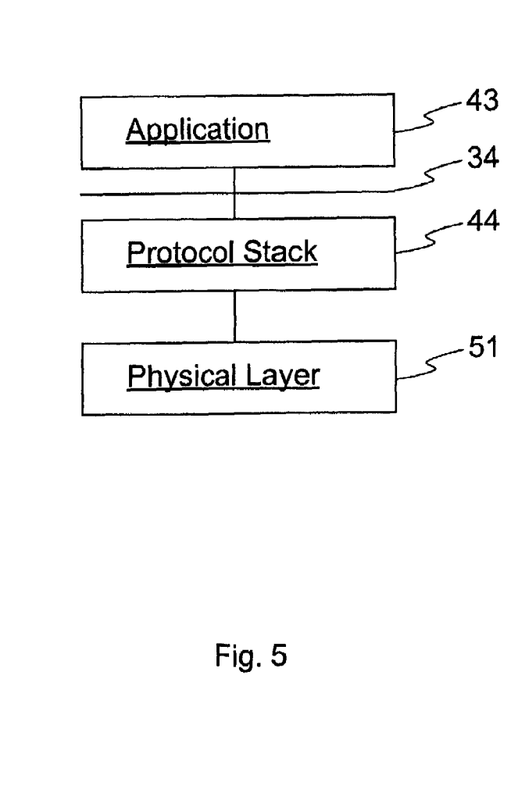
FIG. 5 shows an arrangement of the protocol stacks in relation to the application and the physical layer.

It will be understood that the protocol stack is built on top of a so called bearer or physical layer (which provide datagram services) such as the radio frequency layer utilising for example W-CDMA (Wideband Code Division Multiple Access) in UMTS. This is shown in FIG. 5 illustrating the application program 43, the sockets API 34, the protocol stack 44 and the physical layer 51.

The invention can be implemented in software, i.e. as a computer program product stored on a storage medium. The program code implementing the association of the QoS and the identifier can be part of the program code implementing the socket server. This can be a separate software module or part of the operating system. Thus, in case of the Symbian operating system, the present invention can be implemented into the operating system software that can be downloaded/programmed from a storage medium into the terminal device using the operating system.

This paper presents the implementation and embodiments of the invention with the help of examples. It is obvious to a person skilled in the art, that the invention is not restricted to details of the embodiments presented above, and that the invention can be implemented in another embodiment without deviating from the characteristics of the invention. Thus, the presented embodiments should be considered illustrative, but not restricting. Hence, the possibilities of implementing and using the invention are only restricted by the enclosed patent claims. Consequently, the various options of implementing the invention as determined by the claims, including the equivalent implementations, also belong to the scope of the present invention.

The invention claimed is:

1. A method comprising:
providing a unique identifier (UID, Stream Type) to an application executing in a terminal device, the unique identifier uniquely identifying at least one of the application and the data stream from or to the application;
providing the unique identifier in addition to a port number to a protocol stack in the terminal device;
determining an association between said identifier and a particular Quality of Service (QoS) policy in the protocol stack using a database stored in said terminal device;
determining in the protocol stack within the terminal device QoS parameters contained in the QoS policy;
transmitting from said terminal device to the network the QoS parameters to be applied to the data stream from or to the application; and
applying the (QoS) parameters to the data stream of the application communicating data over a sockets connection.

2. A method according to claim 1, wherein the method comprises transferring the identifier (ULD, Stream Type) over the sockets connection.

3. A method according to claim 1, wherein the method further comprises providing a socket application program interface to the application, establishing a socket for transfer of the data stream, and transferring the identifier (ULD, Stream Type) over the socket application program interface to uniquely identify said at least one of the particular application and the particular data stream, which application or data stream is identified by the identifier, in order apply the particular QoS to the data stream being communicated over the sockets connection.

4. A device comprising:
an application program configured to execute a particular application and to communicate data over a sockets connection, to provide a unique identifier (UID, Stream Type) in addition to a port number to a protocol stack in a terminal device;
an operating system configured to provide the identifier to the application, the identifier uniquely identifying at least one of the application and the data stream from or to the application; and
the protocol stack configured to determine an association between said identifier and a particular Quality of Service (QoS) policy by reading a database stored in said device, to determine in the device the QoS parameters contained in the QoS policy and to communicate from said device to the network the QoS parameters to be applied to the data stream from or to the application.

5. A device comprising:
an application program configured to execute a particular application, to communicate data over a sockets connection and to provide a centrally defined identifier (UID, Stream Type) in addition to a port number to a protocol stack in the device;
an operating system configured to associate the centrally defined identifier to the application, the centrally defined identifier uniquely identifying at least one of the application and the data stream from or to the application; and
the protocol stack configured to determine within the device an association between the centrally defined identifier and a particular Quality of Service (QoS) policy by reading a database stored in said device, to determine within said device the QoS parameters contained in the QoS policy and to communicate from said device to the network the QoS parameters to be applied to the data stream from or to the application.

6. A device according to claim 4, wherein the device further comprises
the protocol stack is configured to provide a socket application program interface to the application, to establish a socket for transfer of the data; and
the application program is configured to transfer the centrally defined identifier (UID, Stream Type) over the socket application program interface to uniquely identify said at least one of the particular application and the particular data, which application or data is identified by the centrally defined identifier, in order apply the particular QoS to the data being communicated over the sockets connection.

7. A computer program product for an electronic device having an application to communicate data over a sockets connection, wherein in that the computer program product comprises;
computer program means for providing a uniquely identifiable identifier (UID, Stream Type) to the application, the identifier uniquely identifying at least one of the application and the data stream from or to the application;

computer program means for providing the identifier in addition to a port number to a protocol stack in the terminal device;

computer program means for determining an association between said identifier and a particular QoS policy in the protocol stack using a database stored in said electronic device;

computer program means for determining in the protocol stack within said electronic device the QoS parameters contained in the QoS policy; and computer program means for communicating from said electronic device to the network the QoS parameters to be applied to the data stream from or to the application.

8. A computer program product according to claim 7, wherein the computer program product further comprises computer program means for providing a socket application program interface to the application, computer program means for establishing a socket for transfer of the data, and computer program means for transferring the identifier CUID, Stream Type) over the socket application program interface to uniquely identify said at least one of the particular application and the particular data, which application or data is identified by the identifier, in order apply the particular QoS to the data being communicated over the sockets connection.

* * * * *